(12) United States Patent
Hasler (10) Patent No.: US 6,351,236 B1
(45) Date of Patent: Feb. 26, 2002

(54) COMBINED GPS AND CDMA IN A MOBILE TRANSCEIVER

(75) Inventor: Raymond Jensen Hasler, Doynton (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/558,122

(22) Filed: Apr. 25, 2000

(51) Int. Cl.[7] .............................. H04B 7/185; G01S 5/02
(52) U.S. Cl. .................................. 342/357.09; 342/357.1
(58) Field of Search ........................... 342/357.09, 357.1

(56) References Cited

U.S. PATENT DOCUMENTS 5,786,789 A * 7/1998 Janky ......................... 342/419
6,002,363 A   12/1999 Krasner

OTHER PUBLICATIONS

Wireless E 911: New Directions in Location Technology, The Yankee Group vol. 6, No. 18, Jun. 1998.
Third Report and Order "Before the Federal Communications Commission" Sep. 15, 1999 FCC 99–245.
An Integrated FBar Filter and PHEMT Switched– Amp for Wireless Applications Henrik Morkner, Rich Ruby, Mike Frank and Domingo Figueredo.

* cited by examiner

Primary Examiner—Theodore M. Blum
(74) Attorney, Agent, or Firm—Pamela Lau Kee (57) ABSTRACT

This novel mobile CDMA station incorporates the global positioning system (GPS). Two modes of operation are possible. One, during GPS operation, there is no transmission or reception of CDMA services. Two, simultaneous CDMA transmissions and reception of GPS are provided. When the mobile receiver is in the CDMA mode, a signal path selector selects the CDMA RF section and the GPS RF section is powered down. During GPS operation, the GPS RF section is selected and the CDMA section is powered down. When CDMA operation is compared with GPS, the average current draw can be less, as the system swaps between the RF sections. The GPS RF section may accept an antenna input from a multi-band antenna network or a separate GPS antenna. The GPS signal is propagated through the existing CDMA channel select filter, having a 1.23 MHz bandwidth and is processed in a base-band signal processor.

12 Claims, 7 Drawing Sheets

COMBINED GPS AND CDMA IN A MOBILE TRANSCEIVER

FIELD OF INVENTION

The invention is directed towards the field of telecommunications, specifically towards incorporating the global positioning system (GPS) into CDMA mobile stations.

BACKGROUND

When a person calls 911, for emergency assistance, the call is passed along by the telecommunications carrier to the local Public Safety Answering Point (PSAP), which is responsible for dispatching the police, fire and medical services. For a caller from a landline telephone, the PSAP can precisely identify the caller's location and telephone number even if the caller does not know his or her location. There is a dilemma when the caller is a wireless phone user.

Today, wireless subscribers make a significant number of emergency calls. The PSAPs, however, are unable to pinpoint the location of these callers. Many wireless networks do not provide the PSAP with Automatic Number Identification (ANI) or Automatic Location Identification (ALI). Without the caller's ANI and ALI, the PSAPs have no way of re-establishing contact with these callers or identifying the location of the caller. This is important in case the call gets cut off and cannot be reestablished by the caller, or for the PSAP to establish the nearest appropriate emergency facility to send. Plus, many wireless users mistakenly believe that their wireless emergency call provides the same functionality as their landline emergency calls have. Incorporating this ANI and ALI into the CDMA mobile transceivers used by the wireless subscriber is an imperative.

In U.S. Pat. No. 6,002,363, "Combined GPS Positioning System and Communications System Utilizing Shared Circuitry", Krasner incorporated GPS into an existing mobile transceiver. Krasner uses a transmit/receive switch that does not require a duplexer to split the transmit and receive paths. His teachings are not compatible for the existing Code Division Multiple Access (CDMA) telecommunications systems because these systems are full duplex systems that must transmit and receive simultaneously.

SUMMARY

The present invention incorporates the Global Positioning System (GPS) into mobile telecommunication stations that use Code Division Multiple Access (CDMA) in their operation. Two modes of operation are possible. In the first mode, GPS operation only, there is a temporary cessation of transmission and reception of CDMA telecommunication services to the last base station used. Such instances occur during a "hard handoff" within the CDMA system. Handoffs are characterized by a temporary disconnection of the Traffic Channel. In the second mode, CDMA telecommunication transmissions and simultaneous reception of GPS are allowed for. By using the existing CDMA telecommunication channel select filter for GPS operation, there is a significant component cost savings.

Within a housing, the mobile CDMA receiver includes an antenna duplexer, that separates simultaneous CDMA telecommunications transmit and receive signals, connected to an antenna. A CDMA low noise amplifier (LNA) and filter section receives the antenna duplexer output while a GPS bandpass filter receives signals from a GPS antenna. The CDMA section contains a low noise amplifier (CDMA-LNA) connected serially to a radio frequency bandpass filter. The GPS section consists of GPS low noise amplifier positioned between two bandselect filters. A signal path selector receives inputs from either CDMA or GPS. A downconverter utilizes the output of the signal path selector and a local oscillator signal to generate an intermediate frequency (I.F) signal. A 1.23 MHz bandwidth channel select device filters the output of the downconverter, which is then further amplified and processed prior to being sent to a baseband processor for recovery of telecommunication signals or GPS data as required.

In operation, when the mobile receiver is in the CDMA telecommunications mode, the signal path selector accepts inputs from the CDMA-LNA-Bandpass filter and the GPS RF section is powered down. For the CDMA case, the wanted channel in the received RF band is converted to the I.F frequency by the proper selection of the local oscillator (LO) signal applied to the I.F downconverter. The I.F signal is further band limited by the I.F filter, e.g. a surface acoustic wave filter (SAW), having a bandwidth defined by the CDMA mobile system characteristics, typically 1.23 MHz.

During GPS operation, the signal path selected is GPS and the telecommunications CDMA-LNA is powered down. Filtering in the GPS module selects the incoming RF signals within the range of interest centered on 1575.42 MHz or the proposed CA code signal at 1227.60 MHz. The selected range of signals are then downconverted to the same IF frequency as that used for mobile CDMA stations and passed through the same IF filter used by the mobile CDMA telecommunication system. The output from the IF filter is further amplified, processed and passed to the baseband processor where GPS data is recovered.

An alternate embodiment adds a dedicated GPS downconversion mixer and moves the signal path selector to the output side of the CDMA downconversion mixer. This provides for an option of driving the GPS downconversion mixer from either an external, fixed frequency, LO synthesizer, or using the existing CDMA synthesizer by switching the LO signal between either the CDMA or the GPS downconverter LO inputs.

DETAILED DESCRIPTION OF THE DRAWINGS

Figure 1:
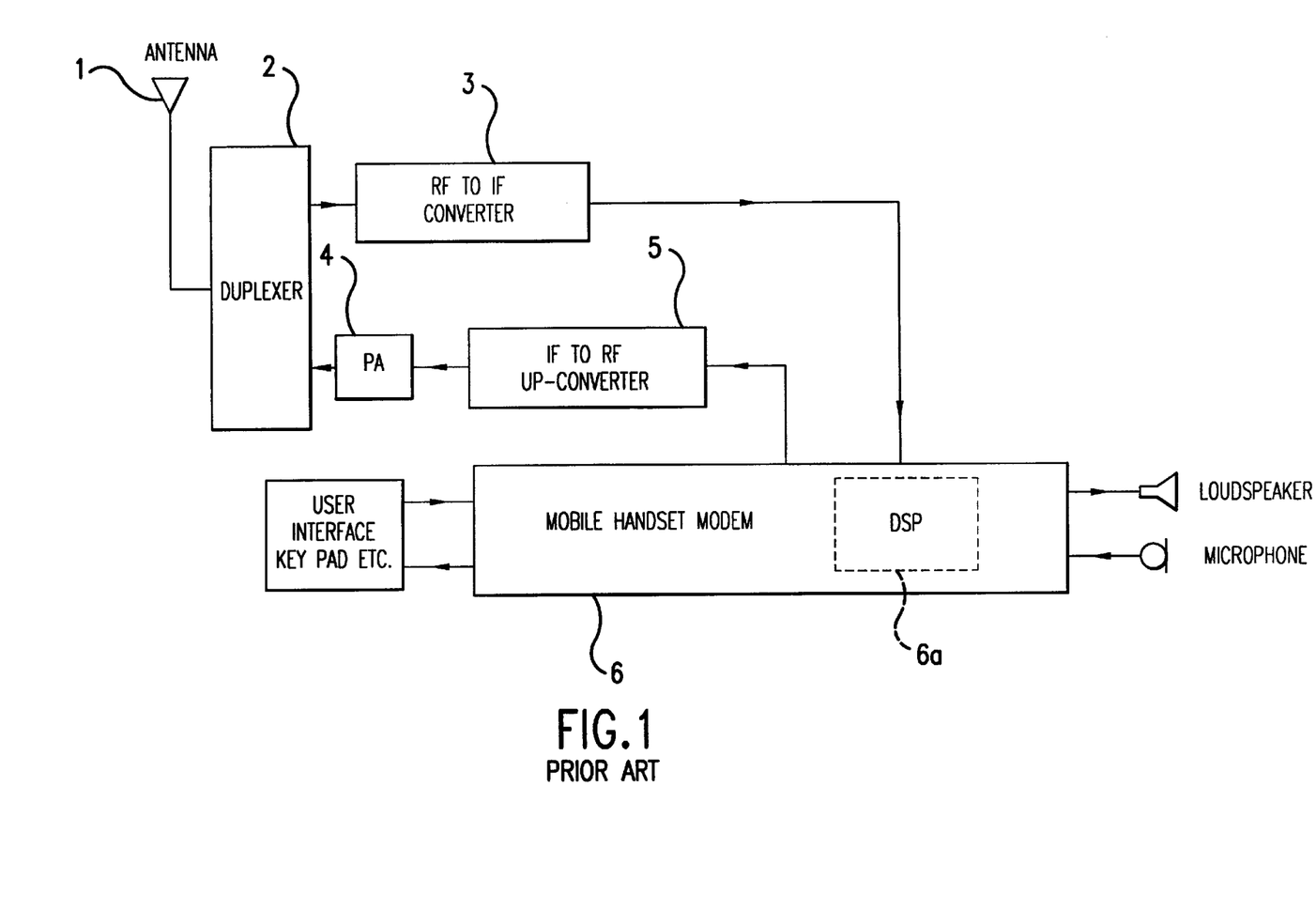
FIG. 1 shows the major blocks of a CDMA transceiver (prior art).

A prior art mobile CDMA station is shown in FIG. 1. Examples may be found in commercial product literature e.g. the Qualcomm MSM3100 data sheet (80-24943-1 Rev B, 7/99) or the Qualcomm CDMA Products Data Book (80-22370-2 C September 1999). A received telecommunications CDMA radio signal propagates from the antenna terminals 1 through the duplexer 2 into the RF to IF converter 3. Within the RF to IF converter 3 the received signal is converted from the high received frequency ranges [depending on the CDMA Telecom system characteristics used] to some lower intermediate frequency (IF) which will enable further signal conditioning. The resulting down-converted CDMA signal is finally processed by a digital signal processor 6a within the mobile modem 6. The modem 6 also generates a baseband CDMA signal for transmission, (required for CDMA telecommunication operation), this signal is up-converted to the higher frequency range required for transmission by an IF to RF up-converter 5 which drives an RF power amplifier 4. This power amplifier 4 feeds the signal into the duplexer 2 that then passes the signal to the antenna 1 for broadcast. When operating in GPS mode, transmit functions are optionally dependent on how the telecommunications service provider integrates GPS into their system.

Figure 1A:
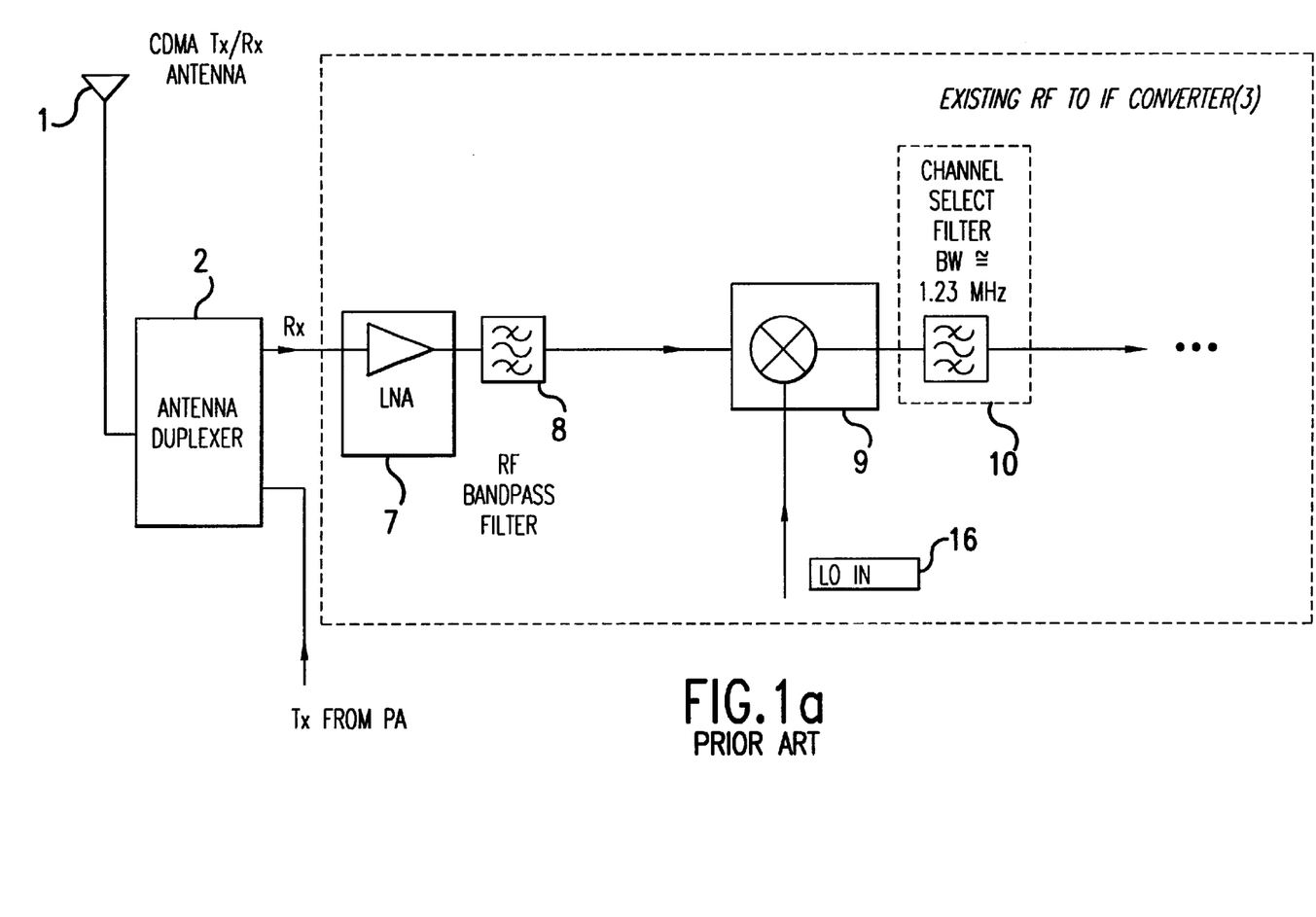
FIG. 1a provides details of the RF to I.F Converter shown in FIG. 1 (prior art).

The manufacturing costs may be reduced by decreasing the number of components, and hence cost, can be saved if the GPS signal is passed through the standard CDMA channel select filter 10, shown in FIG. 1a, used in the RF to IF converter 3. This filter has a typical bandwidth of 1.23 MHz. The GPS is also a code division multiple access (CDMA) system. GPS uses "Gold" codes whilst the CDMA telecommunication system uses "Walsh" codes. The DSP section 6a of the modem 6 can be used to process the mobile station CDMA signals normally received, and GPS signals. Manufacturers, e.g. Qualcomm, have indicated that new modems will support GPS signal decoding.

Prior art GPS-receivers use an IF filter having a 2 MHz bandwidth. This range is selected because the GPS signal power is spread by the Coarse/Acquisition (CA) pseudo-random noise (PRN) ranging code to a bandwidth of 2.046 MHz. The GPS PRN signal has an approximate sin x/x distribution over frequency that has the majority of the signal power contained in a 1.23 MHz bandwidth. Thus, a first order estimate of losses due to reduced bandwidth can be 10 log(1.23E6/2E6)=−2.11 dB. This loss of code power is small compared to that encountered in some GPS implementations, e.g. single hardware channel multiplex receivers, described in "Navstar GPS User Equipment Introduction", Public Release Version, September 1966. Hence, passing the GPS signal through the existing CDMA channel select filter 10 does not significantly degrade GPS performance.

Figure 2:
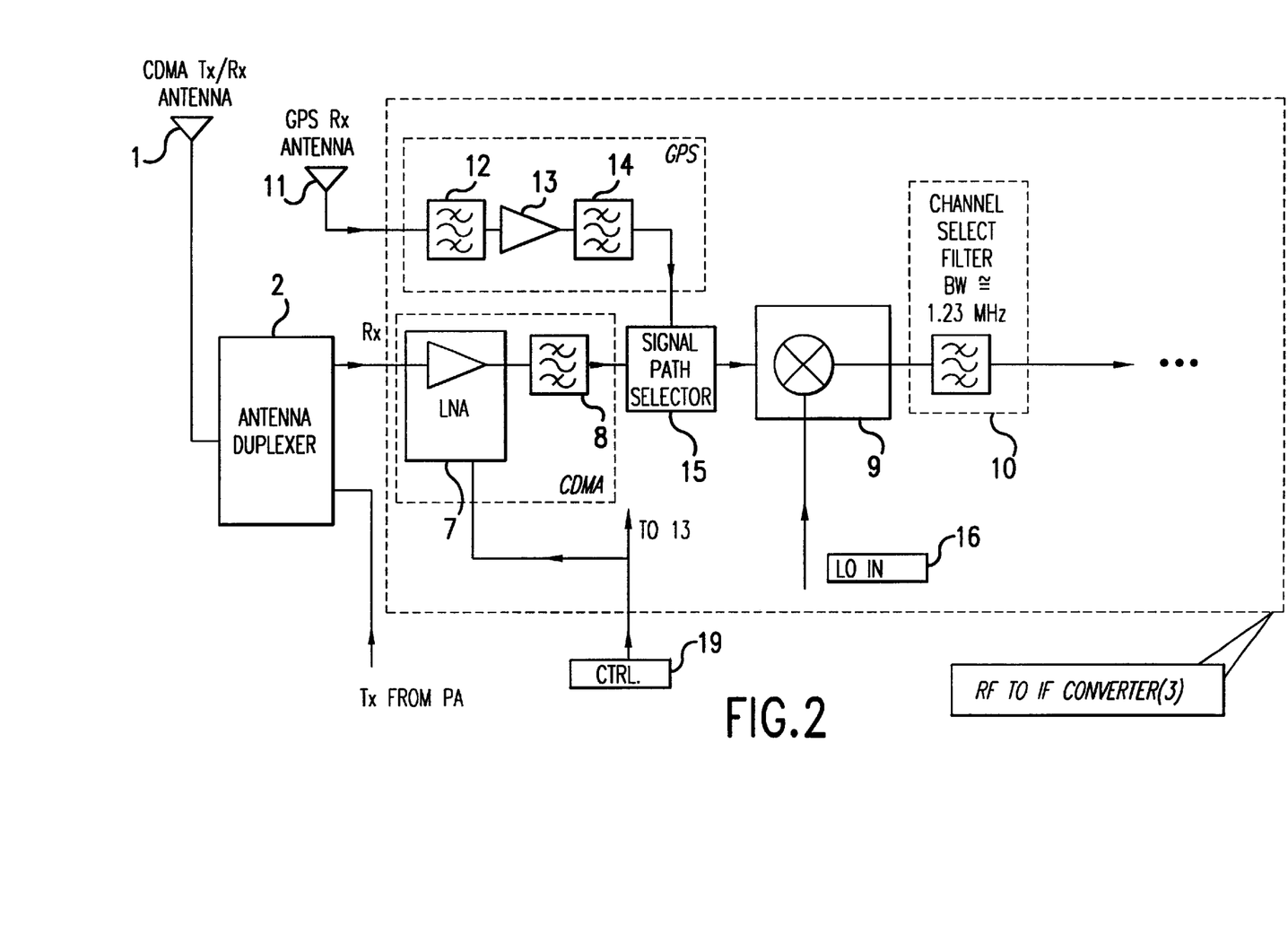
FIG. 2 illustrates a first embodiment of the present invention.

FIG. 2 shows one embodiment of a CDMA telecommunication mobile station receiver with GPS added according to the present invention. Signals received by a GPS antenna 11 are applied to a GPS bandpass filter 12. The GPS section, which generates filtered GPS signals, consists of a GPS low-noise amplifier (GPS-LNA) 13 interposing a first and a second GPS RF bandselect filter, 12, 14, respectively. The second GPS RF bandselect filter 14 also provides image rejection.

Signals received by an antenna duplexer 2 are applied to the CDMA filter section, which band filters the CDMA signals. The CDMA section consists of a CDMA-LNA 7 that receives the antenna duplexer output, the output of the CDMA-LNA 7 being connected to a radio frequency band-select filter 8.

The filtered GPS signals and CDMA signals are received by a signal path selector 15. A RF down-converter 9 receives the output of the signal path selector 15 and a local oscillator signal 16. A intermediate frequency (IF) channel select filter 10 further filters the output of the down converter prior to additional signal conditioning (not shown) the resultant signals are then sent to a baseband processor (not shown) to recover the CDMA telecommunication signals or GPS data as required.

In operation, the signal path selector 15 selects which signal, either the CDMA or GPS, is applied to the RF downconverter 9. The selected signal is converted to the intermediate frequency, by the appropriate local oscillator input 16 to the RF down-converter 9, and passed through the IF channel select filter 10. Thereafter, the signal is further processed by existing circuitry and GPS support is provided in the dsp/modem (6a/6). During operation, when the mobile station is in the CDMA mode, the signal path selector 15 selects the CDMA section and the GPS-LNA 13 is powered down. During GPS operation, the signal path selector 15 selects the GPS section and the CDMA-LNA 7 is powered down.

The selection of the required blocks may be done via a binary control signal 19 where "NOT CDMA=true" would power down the CDMA-LNA 7 and power up the GPS-LNA 13. In addition, the same control signal may control the signal path selector 15. When CDMA operation is compared with GPS, the average current required can be less as the system swaps between the two low noise amplifiers. Where the telecommunication mobile station uses a high dynamic range LNA, e.g. a high input 3rd order intermodulation level (IIP3), the active device current requirements increase as the IIP3 level becomes larger, because GPS reception does not require similar high IIP3 levels the current consumption will be less for GPS operation.

The signal path selector 15 may be implemented in several ways. In a preferred embodiment, this would be integrated semiconductor switch functions that may be embedded with other semiconductor devices that form either a single integrated circuit (IC) for GPS or a single IC for CDMA or a single IC for CDMA and GPS. The signal path selector 15 may alternatively be a circulator, a coupler, phased line lengths that use the out of band impedance characteristics of the filters to transform the effective loading at a junction point, a duplexer, or a diplexer that substitutes or incorporates the filtering functions 8 and 14. In each embodiment, the principle of routing the desired signal along a path to the required point is the same. When the signal path selector 15 is implemented, the main requirement will be to minimize losses before the downconverter 9 such that the CDMA mobile station sensitivity and dynamic range are optimized for a given CDMA-LNA 7 gain.

Figure 3:
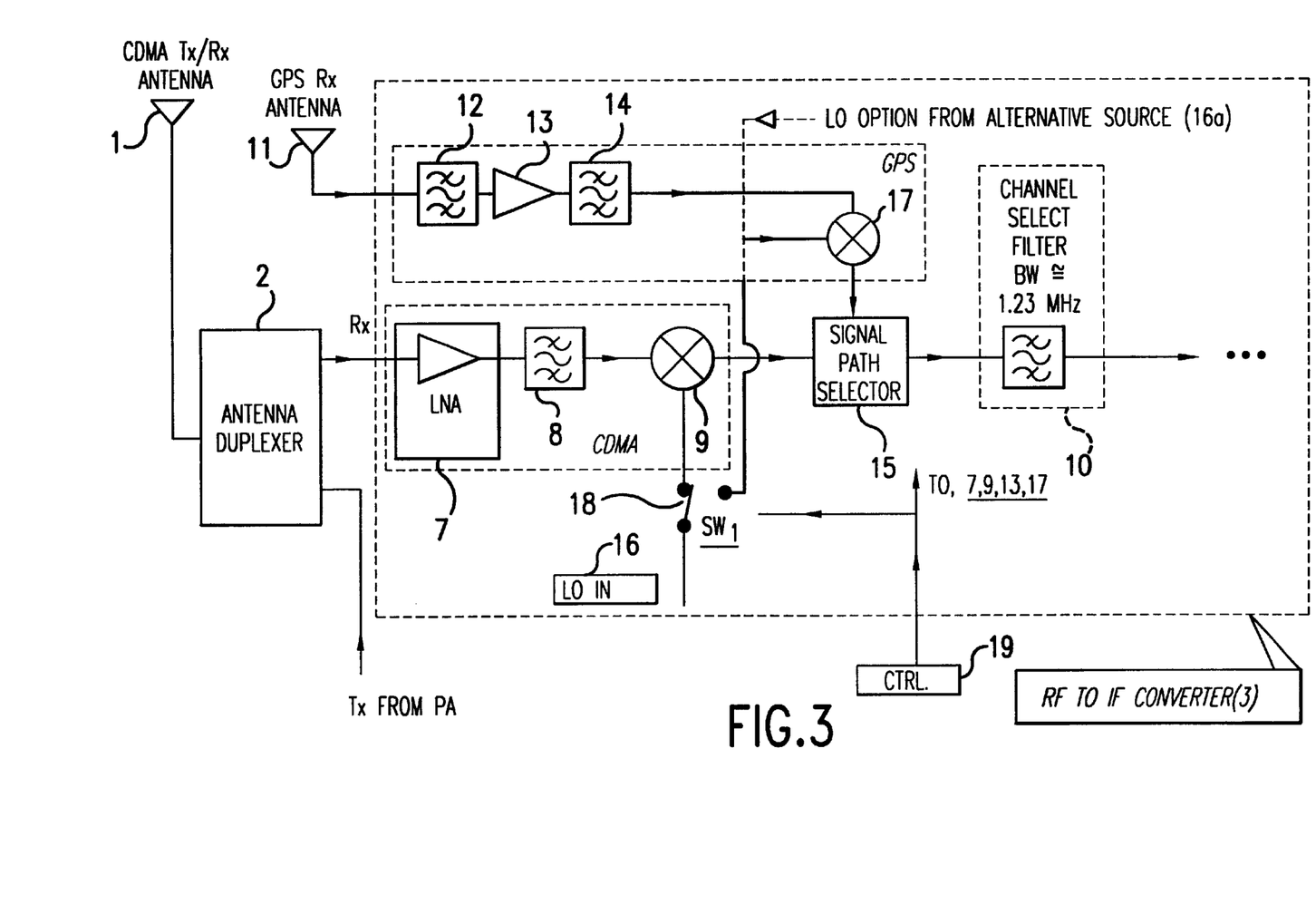
FIG. 3 shows a second embodiment of the present invention.

FIG. 3 illustrates an alternate embodiment. The GPS filter block includes a dedicated GPS down converter 17 following the second bandselect filter 14. The positions of the signal path selector 15 and the telecommunications downconverter 9 have been transposed, compared to the first embodiment. A LO path switch 18 interposes the LO signal 16 and the down-converter 9. The LO path switch 18 also provides an input to the GPS down converter 17. The LO path switch 18 routes the existing single LO signal to the appropriate downconverter: CDMA down converter 9 or GPS down converter 17. The control signal 19 when set "NOT CDMA=true" would switch the LO signal to the GPS converter 17 and power down the CDMA-LNA 7 and the CDMA down converter 9. The GPS-LNA 13 and the GPS downconverter 17 would be powered up. If the signal path selector were implemented as a switch then a "NOT CDMA=true" signal would also select the path that connects the GPS downconverter 17 output to the channel select filter 10.

For the case of "NOT CDMA=false", then the GPS-LNA 13 and GPS down converter 17 are powered down and the CDMA-LNA 7 and CDMA down converter 9 are powered up. The signal path selector 15 now connects the CDMA down converter 9 to the channel select filter 10 and the LO switch 18 now directs the LO signal to the CDMA down-converter 9. It is noted that the LO switch 18 could be implemented as part of the CDMA section (as shown) or part of the GPS section, or as a separate switch function external to either section. In any of these configurations the principle is the same. Throughout these diagrams only a single connecting line is shown, for clarity. In practice signal paths may be "single ended" or "differential" without changing the general principles used in this description. Also mixers of the single sideband form, commonly known as image reject mixers, may be used at 9 and 17 to eliminate or minimise the filtering functions 8 and 14. The use of such devices does not change the general principle used in this description.

Figure 4:
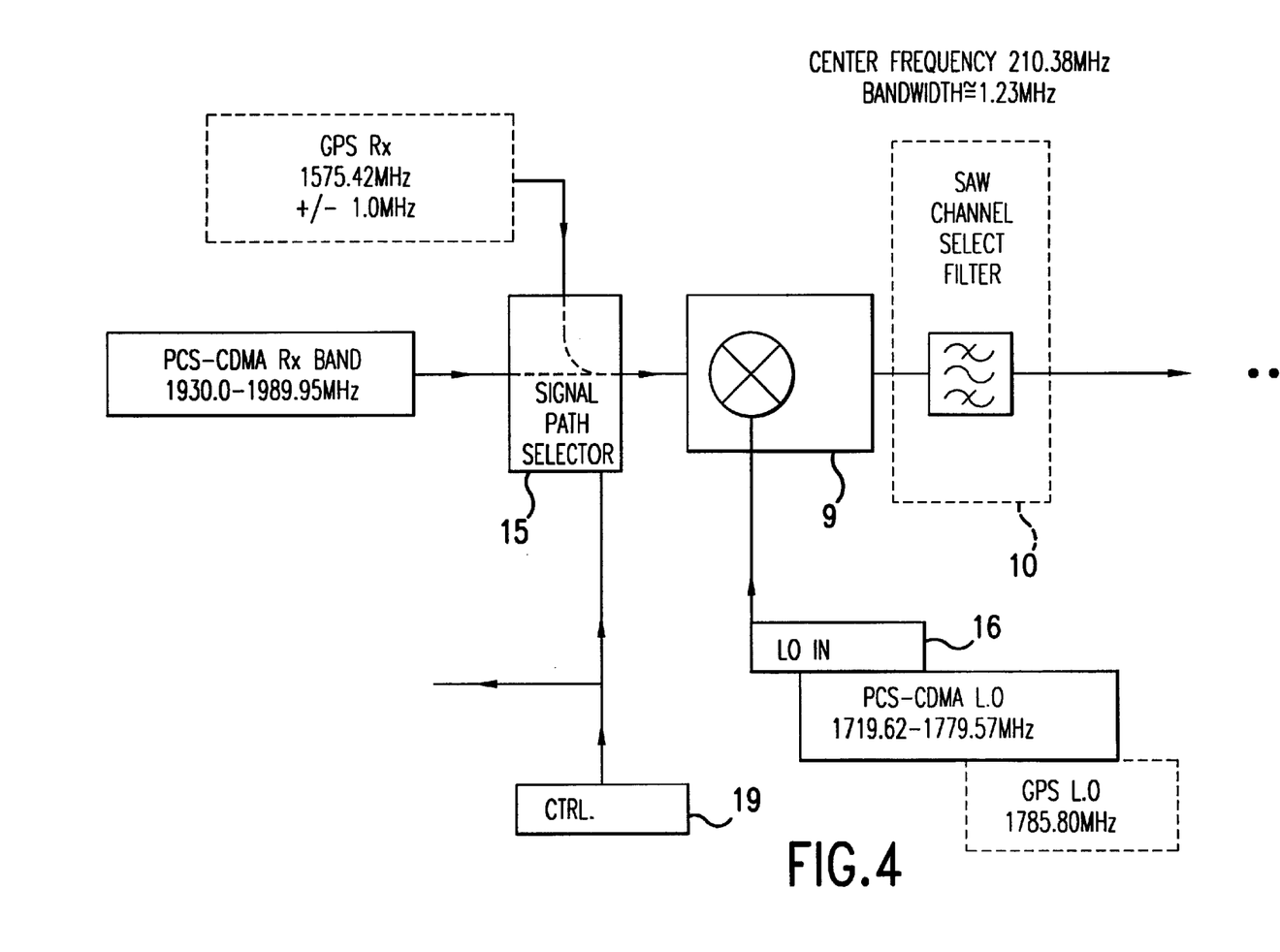
FIG. 4 is an illustrative frequency plan, for US CDMA systems, using the first embodiment.

FIG. 4 shows an illustrative frequency plan for use when the channel select filter 10, shown in FIG. 2, is a SAW filter having a center frequency of 210.38 MHz. For telecommunications CDMA operation (US PCS-CDMA band), the LO signal 16 applied to the down-converter ranges from 1719.62 to 1779.57 MHz. When operating with the GPS L1 Standard Positioning Service (SPS) the LO is fixed at 1785.80 MHz, thus all wanted signals are converted by the down-converter 9 to an IF of 210.38 MHz and passed through the SAW channel select filter 10.

Figure 5:
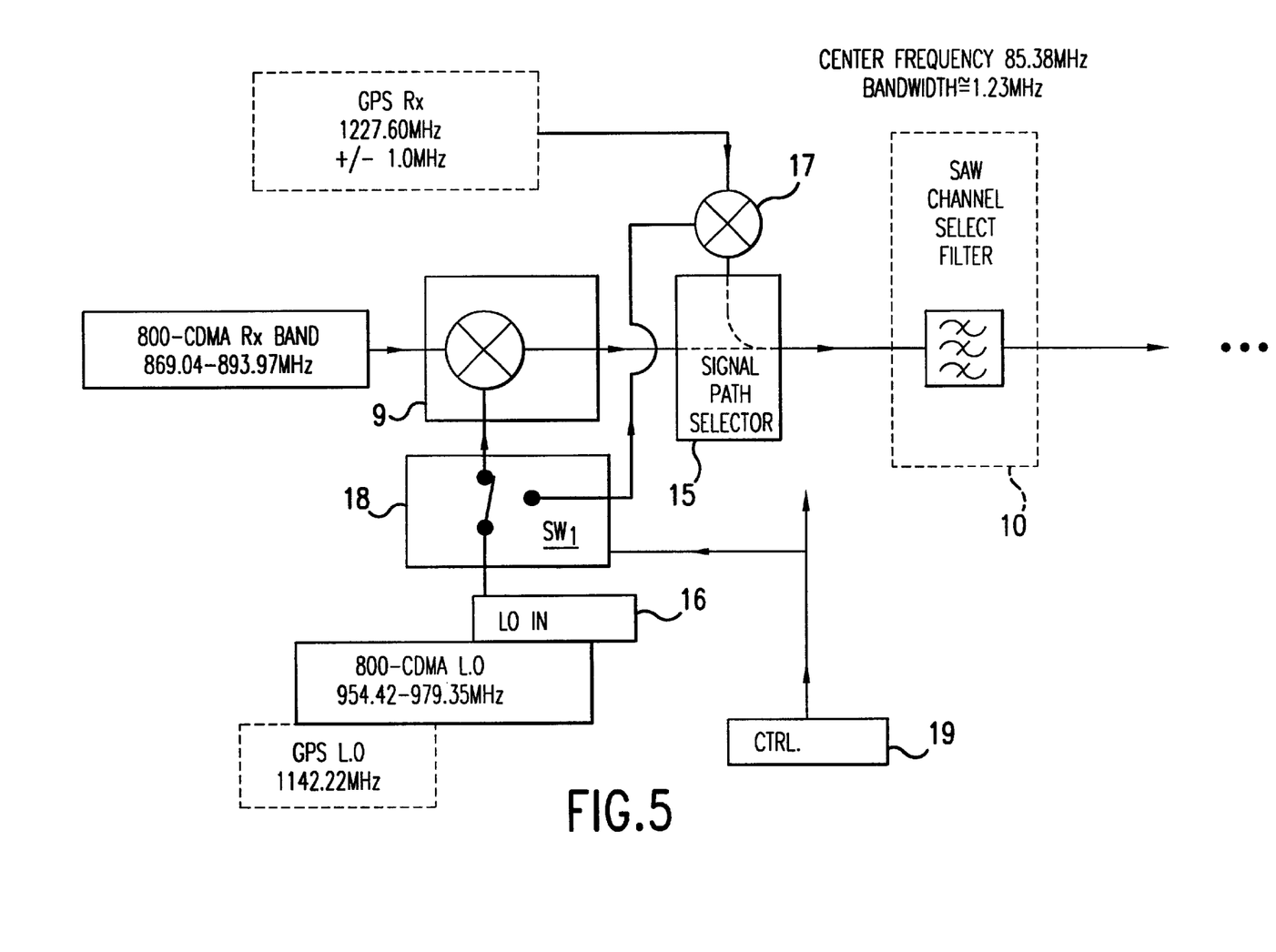
FIG. 5 is an illustrative frequency plan, for US CDMA systems, using the second embodiment.

FIG. 5 shows an illustrative frequency plan for when the channel select filter 10, shown in FIG. 3, is a SAW filter that has a center frequency of 85.38 MHz. For telecommunications CDMA operation (US CDMA band), the LO applied to the down-converter ranges from 954.42 to 979.35 MHz. When operating with GPS L2 SPS, the LO, applied to the GPS down converter 17, is fixed at 1142.22 MHz, thus all wanted signals are converted by either the CDMA down-converter 9 or the GPS down-converter 17 to an IF of 85.38 MHz and passed through the SAW channel select filter 10. It will be evident to those skilled in the art that the frequency plans given in FIGS. 4 and 5 are interchangeable between either of the embodiments shown in FIGS. 2 or 3. Also, that other frequency plans can be used to give the same final IF frequencies.

Figure 6:
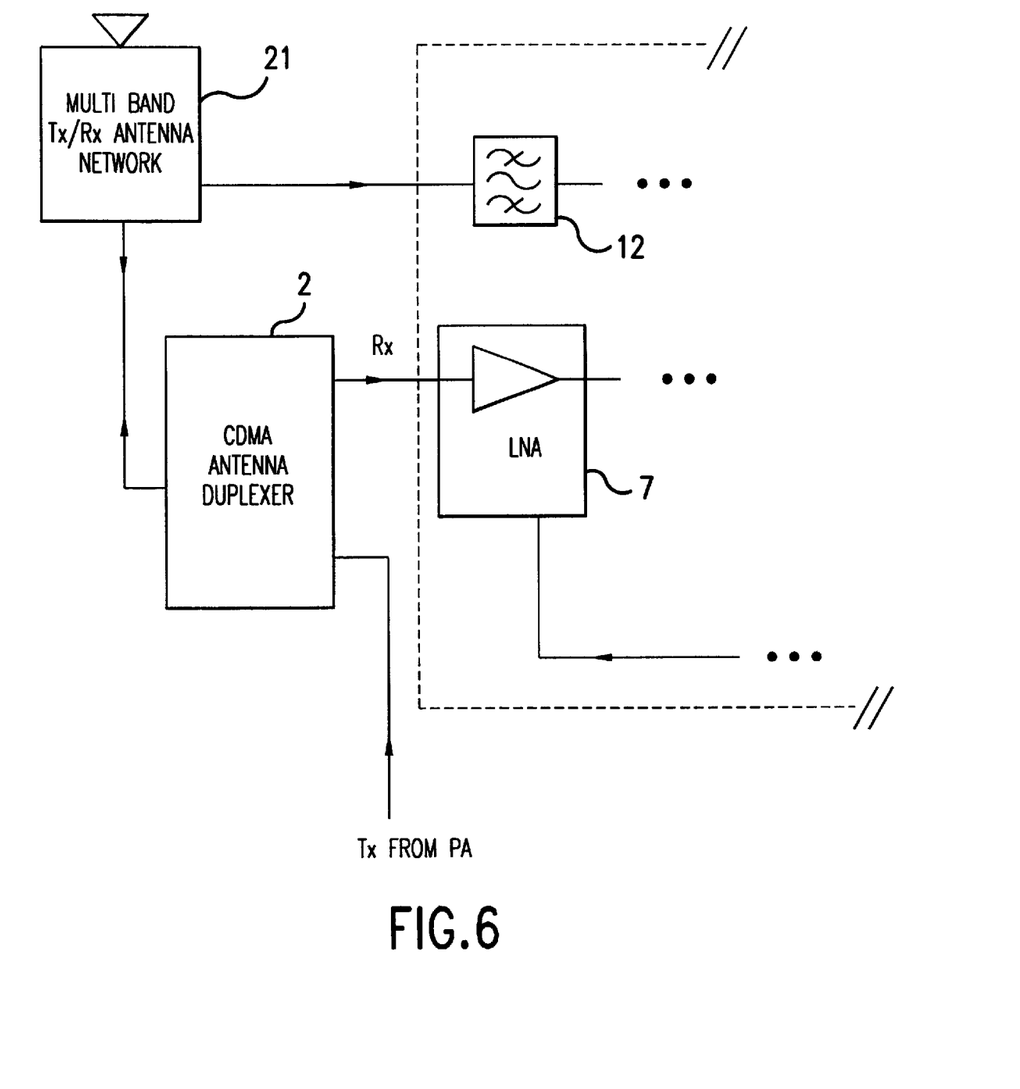
FIG. 6 shows GPS and CDMA signal reception operated from multi-frequency antenna networks.

FIG. 6 shows an alternate signal input arrangement for the GPS input to the band select filter 12. In FIGS. 2 and 3, the CDMA telecommunication signal is received by a dedicated CDMA antenna 1 and GPS signals are also received on a GPS antenna 11. The GPS section may accept an antenna input from a multi-band antenna network (21) or a separate GPS antenna. Multiple band antennas are well documented in prior art as are antenna network switch solutions.

What is claimed is:

1. A CDMA mobile station comprising:
   CDMA antenna;
   a GPS antenna;
   a duplexer, connected to the CDMA antenna;
   a GPS section, connected to the GPS receive antenna, including,
      a first and second filter, the first filter connecting to the GPS antenna, and
      an amplifier positioned between the first and second filters;
   a CDMA section, connected to the duplexer;
   a signal path selector, connected to the GPS and CDMA sections;
   a down conversion mixer, connected to the signal path selector, for frequency converting the output of the selected one of the GPs and CDMA sections;
   a band select filter, connected to the down conversion mixer, having an output; and
   a digital signal processor, receiving a signal derived from the output of the band select filter.

2. A CDMA mobile station, as defined claim 1, wherein one of the duplexer, band select filter, and the first and second filters of the GPS section is selected from a group that includes thin film bulk acoustic wave resonator filters, ceramic filters, and surface acoustic wave filters.

3. A CDMA mobile station, as defined in claim 1, wherein the switch is selected from a group that includes a mechanical switch, a semiconductor switch, a duplexer, a diplexer, a coupler, a circulator, and phased line lengths.

4. A CDMA mobile station, as defined in claim 1, wherein the downconversion mixer is a "single sideband image reject" device that minimizes the function of the second filter of the GPS section.

5. A CDMA mobile station, as defined in claim 1, wherein the band select filter is a filter having a passband greater than 1.23 MHz.

6. A CDMA mobile station comprising:
   CDMA antenna;
   a GPS antenna;
   a duplexer, connected to the CDMA antenna;
   a GPS section, connected to the GPS receive antenna, including,
      a first filter connecting to the GPS antenna,
      an amplifier connecting to the first filter,
      a second filter connecting to the amplifier, and
      a GPS down conversion mixer, connected to the second filter;
   a CDMA section, connected to the duplexer;
   a CDMA down conversion mixer, connected to the CDMA section;
   a signal path selector, connected to the down conversion mixer and the GPS section;
   a local oscillator signal switch, connecting to the GPS and CDMA down conversion mixers;
   a band select filter, connected to the signal path selector, having an output; and
   a digital signal processor, receiving a signal derived from the output of the band select filter.

7. A CDMA mobile station, as defined claim 6, wherein one of the duplexer, band select filter, and the first and second filters of the GPS section is selected from a group that includes thin film bulk acoustic wave resonator filters, ceramic filters, and surface acoustic wave filters.

8. A CDMA mobile station, as defined in claim 6, wherein the switch is selected from a group that includes a mechanical switch, a semiconductor switch, a coupler, and phased line lengths.

9. A CDMA mobile station, as defined in claim 6, wherein the band select filter is a filter having a passband greater than 1.23 MHz.

10. A CDMA mobile station, as defined in claim 6, further comprising a fixed frequency source connected to the GPS downconversion mixer.

11. A CDMA mobile station, as defined in claim 6, wherein the downconversion mixer is a "single sideband image reject" device that minimizes the function of the second filter of the GPS section.

12. A CDMA mobile station comprising:
   CDMA antenna;
   a GPS antenna;
   a duplexer, connected to the CDMA antenna;

a GPS section, connected to the GPS receive antenna, including,
   a first filter connecting to the GPS antenna,
   an amplifier connecting to the first filter,
   a second filter connecting to the amplifier,
   a GPS oscillator, and
   a GPS down conversion mixer, connected to the second filter and the GPS oscillator,
a CDMA section having a CDMA oscillator, connected to the duplexer;
a CDMA down conversion mixer, receiving the CDMA oscillator signal;
a signal path selector, connected to the down conversion mixer and the GPS section;
a band select filter, connected to the signal path selector, having an output; and
a digital signal processor, receiving a signal derived from the output of the band select filter.

* * * * *